Aug. 21, 1945.    P. A. SMITH    2,383,276
DIFFERENTIAL BACKSTOP FOR CONVEYERS, ELEVATORS, ETC
Filed July 31, 1944    3 Sheets-Sheet 1

Inventor
PAUL A. SMITH.
Charles W. Hills
by
Attys.

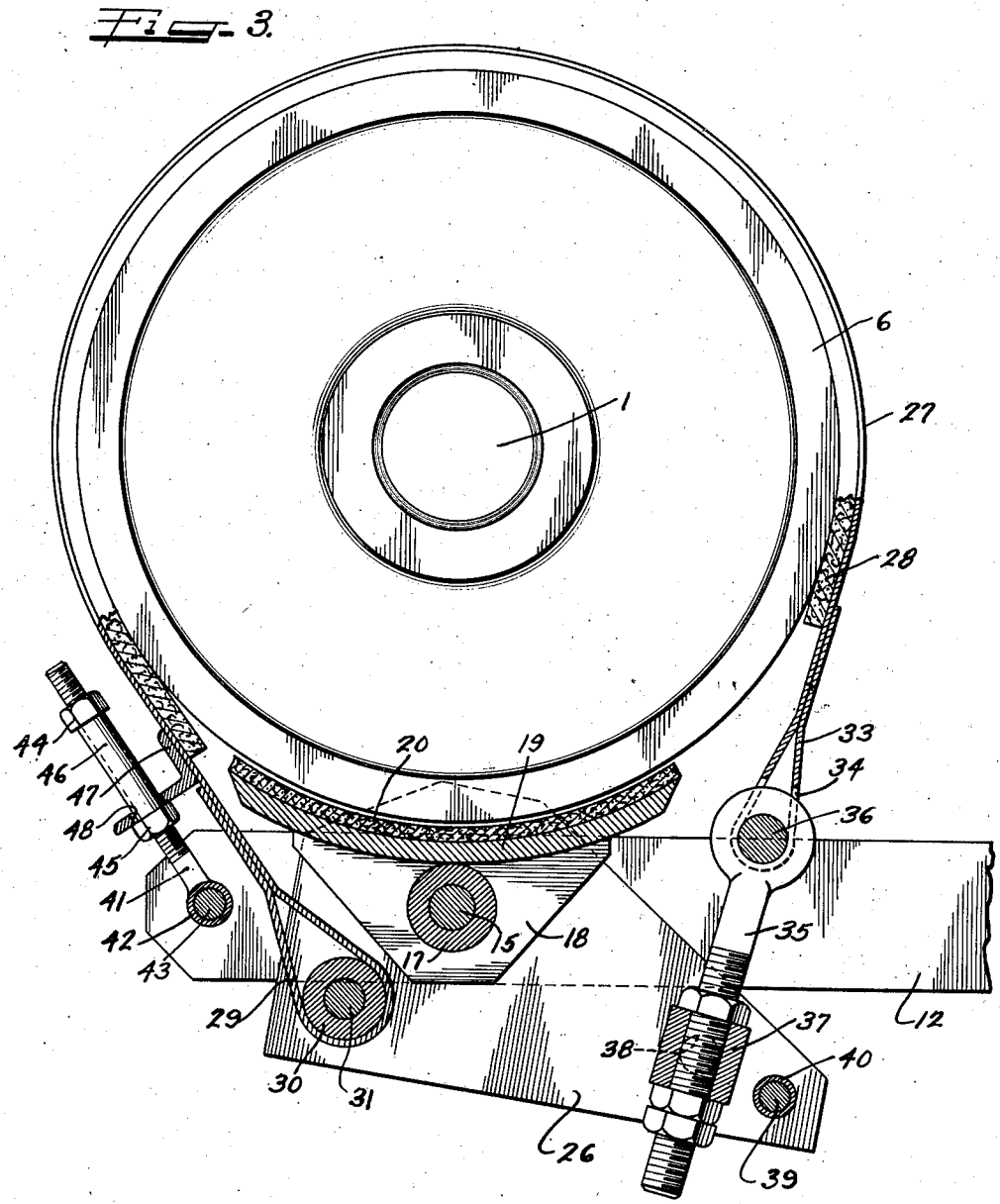

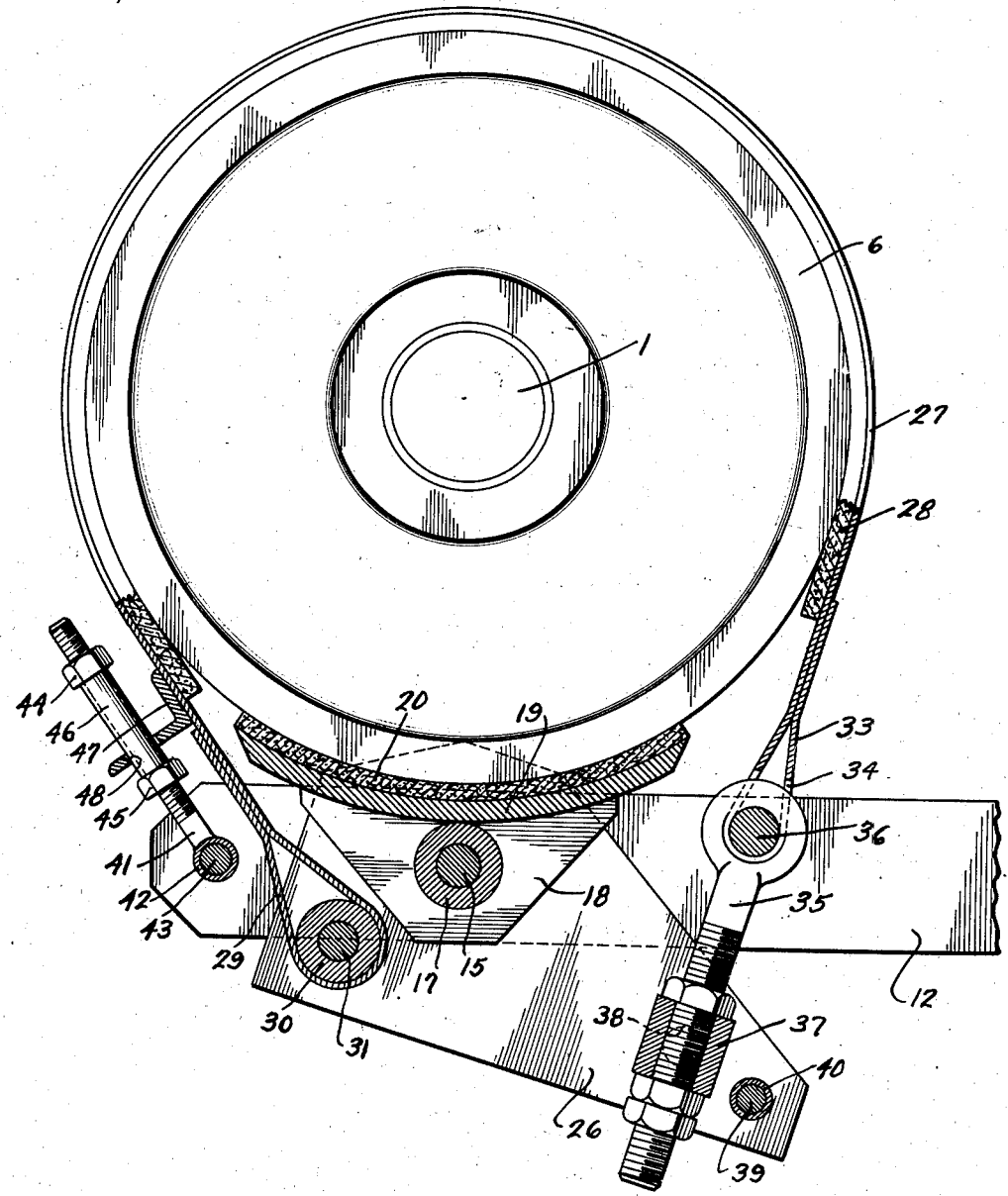

Patented Aug. 21, 1945

2,383,276

UNITED STATES PATENT OFFICE 2,383,276

DIFFERENTIAL BACKSTOP FOR CONVEYERS, ELEVATORS, ETC.

Paul A. Smith, Aurora, Ill., assignor to Barber-Greene Company, Aurora, Ill., a corporation of Illinois Application July 31, 1944, Serial No. 547,458

2 Claims. (Cl. 188—82)

This invention relates to improvements in a differential backstop for conveyers, elevators, etc., and more particularly to a backstop braking mechanism to prevent conveyers, elevators, and equipment of the same general character from moving backwards by virtue of the load thereon when forward motion is stopped, although the invention may have other uses and purposes as will be apparent to one skilled in the art.

In the past, many and various differential backstops, band brakes, and the like have been developed for preventing back-run in the event the motive power is shut off while the ascending run of an elevator or conveyor is loaded. Such devices have been used upon both vertical and inclined elevators, endless conveyers and similar equipment. Heretofore, however, in all instances of which I am aware, the frame of a machine, that is, the conveyer or elevator or whatever the machine may be, carried not only the torque load during braking but also provided the reactive force opposite to the active braking force. In other words, where a band brake was used as a backstop, the load forces on the brake band were transmitted to the supporting frame of the machine in addition to the torque load. This was objectionable because of the difficulty in providing adequate braking with lighter external loads especially on rather lightweight portable equipment. Another objectionable feature to devices of this character heretofore known is the lack of any safety factor so far as the brake band is concerned, that is, if the brake band lining became worn, there was nothing in addition to help the braking operation other than the worn brake band.

With the foregoing in mind, it is an important object of the instant invention to provide an automatic differential backstop arranged to divorce the brake load from the machine with which the backstop is associated.

Another object of this invention is the provision of a differential backstop arranged to provide highly effective braking with lighter external loads, which is particularly advantageous on lightly constructed equipment such as portable units.

It is also an object of this invention to provide a differential backstop so arranged that all forces except the torque load are kept free of the machine or its frame, and all these forces are utilized in effective braking, both as to the active and reactive forces.

It is also a feature of this invention to provide a differential backstop including a brake drum upon which both a brake band and a brake shoe may be brought into action.

Still a further object of the invention is the provision of an automatic differential backstop involving a brake drum and a brake band and which is so arranged that the reactive force resulting from the pull on the brake band is utilized to provide additional braking effort.

Also a feature of the invention resides in the provision of a differential backstop including a brake drum and a brake band, so arranged that the reactive force resulting from a braking pull on the brake band is brought back to the brake drum by way of a brake shoe.

A further feature of the invention resides in the provision of a differential backstop involving a brake drum, a brake band, and a brake shoe, and in which the reaction to a pull on the brake band presses the shoe into engagement with the drum.

It is a still further object of the instant invention to provide a differential backstop braking mechanism which, with the exception of the brake drum, is connected to the machine with which it is associated only at a single pivot point, and which is very easily and simple adjusted when installed.

Also an object of the invention is the provision of a differential backstop braking mechanism especially designed to provide an extremely high braking effect and yet be economical in construction and use and relatively light in weight.

While some of the more salient features, characteristics and advantages of the instant invention have been above pointed out, others will become apparent from the following disclosures, taken in conjunction with the accompanying drawings, in which Figure 1 is a fragmentary side elevational view of a differential backstop mechanism embodying principles of the instant invention, showing the same associated with endless conveyer elevator equipment, such equipment being indicated diagrammatically in the drawings;

Figure 3 is an enlarged fragmentary elevational view, with parts shown in section, of a portion of the braking mechanism seen in Figures 1 and 2, showing the same with the braking means in released position; and Figure 4 is a view similar to Figure 3, but illustrating the braking means in braking position.

As shown on the drawings:

Figures 1, 2:
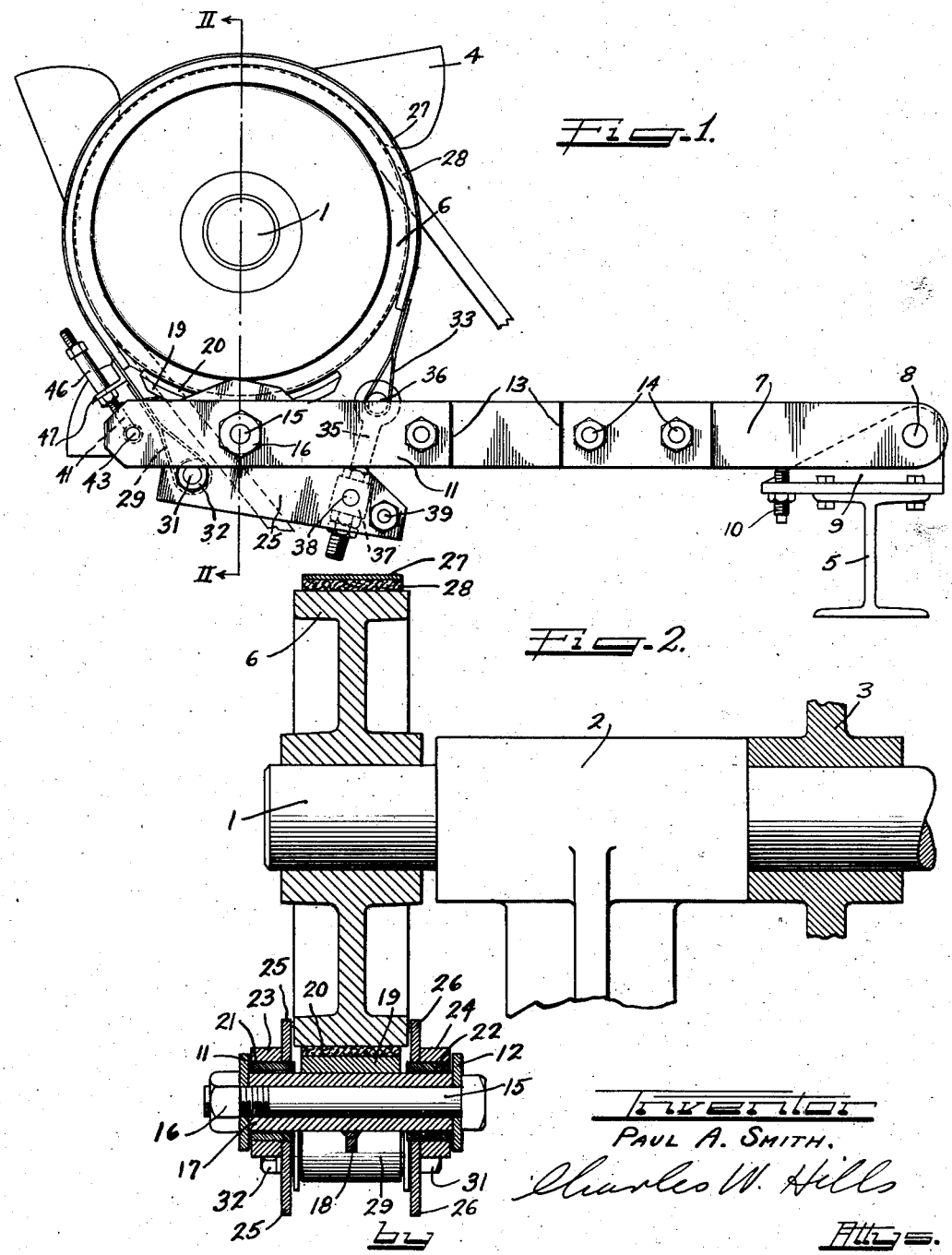
Figure 2 is a fragmentary transverse vertical sectional view, with parts in elevation, taken substantially as indicated by the line II—II of Figure 1, looking in the direction of the arrows.

The illustrated embodiment of the instant invention is shown associated with a material elevating machine, illustrated diagrammatically, including a transverse head shaft 1 carried in a suitable bearing support 2. This shaft is provided with a conveyer drive element 3 which operates an endless bucket conveyer 4. As the conveyer is viewed in Figure 1, the shaft 1 rotates counter-clockwise for the conveyer to elevate material. The frame structure of the elevating machine is not illustrated with a single exception of the part most intimately associated with the instant backstop invention. Such portion of the frame structure includes a transverse supporting beam 5, as seen in Figure 1.

It will be appreciated that when the conveyer mechanism is in operation, and the ascending buckets are loaded with material, if for any reason the motive power should be cut off, the weight of material in those buckets tends to cause a back-run of the conveyer. The present invention is, of course, designed to automatically prevent any such back-run.

The braking mechanism includes a brake drum 6 mounted on an extended end of the shaft 1 and keyed or otherwise secured to the shaft for rotation therewith. Braking means including both a brake band and a brake shoe to be hereinafter described act upon the drum 6 whenever the shaft 1 tends to move in a reverse direction.

The braking mechanism includes an arm 7 pivoted as indicated at 8 to an anchor bracket 9 mounted upon the aforesaid frame member 5. This is the only connection to the frame of the elevating machine of the braking mechanism acting upon the drum 6. A set screw 10 extending through the horizontal flange of the bracket 9 abuts the underside of the arm 7 and provides a downward limit for the pivotal movement of the arm. The arm 7 may be of one integral construction throughout its length, or fabricated from initially separate pieces as illustrated. In the selected showing, side members 11 and 12, each of which is bent as indicated at 13, are attached to the arm 7 by means of bolts 14 or in any other equivalent manner. The composite structure of the arm, therefore, is in effect a single arm at the rear part connected with the pivot 8 and a bifurcated forward portion including the furcations 11 and 12, seen in Figure 2.

Extending through the furcations 11 and 12 in a transverse direction is a headed bolt 15 with which a nut 16 is associated outside the furcation or member 11. Around the shank of the bolt 15 is a spacer sleeve 17 which has fixed thereto as by welding, brazing, or an equivalent operation, the carrying portion 18 of a brake shoe 19. When the nut 16 is loosened, the brake shoe and spacer sleeve 17 are free to pivot around the shank of the bolt 15. The brake shoe may be provided with a suitable lining 20 for frictional contact with the drum 6.

Around the end portions of the spacer sleeve 17, but spaced inwardly from the extreme ends of this sleeve, are bearing members 21 and 22 provided with circumscribing spacer collars 23 and 24, respectively (Figure 2). It will be noted that each such bearing member together with its spacer collar is disposed sufficiently inwardly from the respective ends of the sleeve 17 so that these bearing members will not be squeezed between the furcations 11 and 12 when the nut 16 is tightened on the bolt 15. Pivotally disposed on the bearing member 21 is a bell crank plate 25, and a like plate 26 is pivotally disposed on the bearing member 22. It will be noted with reference to Figures 1, 3 and 4 that the plates 25 and 26 are pivoted at what may be termed their elbows.

The bell crank plates 25 and 26 jointly hold the ends of a brake band 27 extending around the aforesaid drum 6, which brake band may be lined with any suitable material as indicated at 28. One end of the brake band is formed into a loop 29 engaged around a spacer sleeve 30 freely surrounding the shank of a bolt 31 extending through the plates 25 and 26 and locked by a suitable nut 32. Suitable washers may be used at each end of the spacer sleeve 30, if so desired. The other end of the brake band is formed into a loop 33 divided in its central portion as indicated at 34 to permit the ring of an eyebolt 35 to extend between the portions of the loop, and these portions are engaged over a pin 36 extending through the ring of the eyebolt. The shank of the eyebolt 35 extends through a polygonal pivot shaft 37 disposed transversely between the bell crank plates 25 and 26 and having rounded end portions 38 journalled in the plates themselves. The plates 25 and 26 are held in the proper degree of spacing adjacent the polygonal shaft 37 by means of a suitable through bolt and nut arrangement 39 with a spacer sleeve 40 around the shank of the bolt between the plates. This arrangement plus the bolt 31 with the sleeve 30 around the shank thereof maintain the plates 25 and 26 in fixed position relatively to each other. These plates must therefore pivot in unison during operation of the braking mechanism.

The brake band 27 is preferably a truly formed band so that even when it is in the released position it hugs the brake drum 6 to some extent. Preferably, it should hug the brake drum when in released position to just a sufficient extent to cause a locking of the braking mechanism when the drum tends to rotate in the opposite direction. Means are provided, therefore, to limit the amount of release movement of the brake band. These means include an upstanding bolt 41 having its inner end welded or otherwise secured to a sleeve 42 surrounding the shank of a shaft 43 carried by the outer ends of the furcations 11 and 12. The bolt extends obliquely upwardly from between the furcations substantially parallel to the adjacent portion of the brake band 27. The shank of the bolt is provided with a pair of spaced nuts 44 and 45 adjustable to define the correct position for a sleeve 46 between the nuts. An angle bracket 47 carried by the brake band itself has a leg extending outwardly and apertured as indicated at 48 to ride over the sleeve 46. When the brake band is in released position, as seen in Figure 3, the extended leg of the bracket 47 abuts the nut 45 and prevents further release movement of the brake band. When the brake band tightens around the drum 6 by virtue of a tendency of the drum to rotate in the opposite direction, the angle bracket 47 will move up along the sleeve 46 substantially to the position seen in Figure 4.

When the braking means are installed, they must of course be adjusted for optimum operation. The preferred form of making the adjustment includes first pressing the brake shoe 19 firmly against the brake drum 6 and then tightening the nut 16 on the bolt 15 to fix the shoe relatively to the furcations 11 and 12 of the arm 7. The set screw 10 on the anchor bracket 9 is then adjusted to drop the arm 7 so that there is a slight clearance between the brake drum and the brake shoe, say one-sixteenth inch for example. The take-up bolt 35 may then be adjusted so that the bell crank plates 25 and 26 are substantially in the position seen in Figure 3 when the brake is released. After that, the stop bolt may be adjusted so that there is a relatively great clearance between the nut 45 and the bracket arm 47 with the brake band just hugging the brake drum. Then, the drum is rotated back and forth while this dimension is decreased until the brake locks.

In the final setting, the clearance between the bracket leg and the nut 45 should be a few eighths inch with the brake locked, say three-eighths inch for example. The mechanism is then ready for operation.

One feature of the braking mechanism above described should be distinctly noted. This is a difference in moment or leverage arms between each of the ends of the brake band and the pivot point of the plates 25 and 26. It will be seen that the bolt 31 is much closer to the bolt 15 than is the shaft 37. This difference in moment arms causes a raising of the arm 7 upon a tendency of the brake drum 6 to rotate in the opposite direction, and a lowering of that arm when the brake drum starts its normal direction of rotation.

In operation, the present invention is extremely simple and yet highly effective. Assuming that the shaft 1 together with the brake drum 6 are turning counter-clockwise as seen in the drawings so that the conveyer 4 is actively elevating material, upon a sudden cutting off of the motive power, the weight of material upon the conveyer will tend to rotate the shaft 1 and the brake drum 6 in the opposite direction, namely, clockwise as seen in the drawings. While operation continues in the normal direction, the braking mechanism will have the position seen in Figure 3, the brake shoe being off the drum, and the brake band hugging the drum to a sufficient extent to provide enough friction to insure locking of the brake band upon a tendency toward reverse movement. As soon as the motive power is cut off, and the brake drum 6 tends to rotate in the opposite direction, there will be an upward pull by the band loop 29 upon the bolt 31, and a corresponding release, if not a slight downward pressure, upon the bolt 35 associated with the opposite end of the band. The upward pull on the bolt 31 results in elevating the arm 7 together with its furcations 11 and 12 providing a dual result, namely a tightening of the brake band around the brake drum, and the elevation of the brake shoe into contact with the drum. With the parts arranged as above described, it will be noted that the reaction to the pull on the band is a pressure of the shoe against the drum. In other words, both the active and reactive forces are converted into positive braking effort. Rather than provide merely a pull upon the brake band to tighten it around the drum with the reaction to that pull carried by the frame of the machine, the reaction is converted into braking effort by way of the brake shoe 19 so that there is both a greater braking action and a considerably lesser load on the machine frame. This is highly advantageous especially in portable units of light construction. The only load upon the arm 7 is a tension load. With this arrangement, it is only necessary outside of the connection of the drum 6 to the shaft 1 to make a single point connection between the braking means and the machine frame, namely at the pivot point 8.

When the motive power is again turned on, and the shaft 1 and brake drum again turn in the counter-clockwise direction, the parts assume the position seen in Figure 3. In this instance, there will be an upward pull upon the bolt 35 and a consequent pivoting of the bell crank plates 25 and 26 from the position seen in Figure 4 to the position seen in Figure 3, and a consequent dropping of the arm 7 upon the upper end of the set screw 10, thus releasing the brake shoe. The band, of course, also releases and the release movement of the band is limited by virtue of the protruding leg of the bracket 47 abutting the nut 45 on the stop bolt 41. Sufficient hugging of the brake drum is thereby still maintained to insure a positive acting of the brake mechanism again upon a tendency of the brake drum to rotate in the reverse direction. The weight of the parts themselves furnish sufficient drag that when the mechanism is reversed due to the reversal of the conveyor or the elevator, the setting of the brake is readily actuated. More weight may be incorporated in the parts to effect this result, if desired.

From the foregoing, it is apparent that I have provided a highly efficient and yet light-weight differential backstop braking mechanism in which the brake load is entirely divorced from the frame of the machine, and the reaction to the tightening of the brake band is utilized and converted into additional braking effort by way of the brake shoe. Thus, the machine frame carries only a torque load. It will further be noted, that the combination of the brake band and the brake shoe acting upon the drum provides a considerable additional amount of braking effort, and this is highly desirable especially with light external loads, and relatively light equipment. It will also be appreciated that the mechanism is simple in construction, highly durable, and economical to manufacture and use.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an automatic backstop brake for an elevating machine, a brake drum on a shaft of the machine, a freely projecting supporting arm pivoted near one end to the frame of the machine, a brake shoe pivotally connected to the free portion of said arm, a brake band around said drum, a bell crank member carried by said arm with its elbow pivoted on the same axis as the brake shoe, the ends of said band being connected to said bell crank member on opposite sides of the pivot point but at different distances therefrom, means to limit the pivotal movement of said arm away from said drum, and means to limit the release movement of said band when the drum rotates in a forward direction to maintain sufficient friction to automatically cause a locking of the band when the drum tends to turn in a reverse direction.

2. In an automatic backstop brake for a machine shaft, a brake drum on the shaft, an automatically movable supporting arm pivotally supported adjacent the drum, a brake shoe pivotally connected to said arm, a brake band around said drum, and a member carried by said arm with a portion pivoted on the same axis as the brake shoe, the ends of said band being connected to said member on opposite sides of the pivot point but at different distances therefrom so as to insure automatic locking of the band when the drum tends to turn in a reverse direction and movement of the brake shoe into braking contact with the drum.

PAUL A. SMITH.